US012664462B2

(12) United States Patent     (10) Patent No.:   US 12,664,462 B2
Krenz et al.     (45) Date of Patent:   Jun. 23, 2026

(54) REAL-TIME ARTIFICIAL INTELLIGENCE AND/OR MACHINE LEARNING (AI/ML) SYSTEMS

(71) Applicant: Hamilton Sundstrand Corporation, Charlotte, NC (US)

(72) Inventors: Michael Krenz, Roscoe, IL (US); Darin Michael Underwood, Cedar Rapids, IA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1205 days.

(21) Appl. No.: 17/571,015

(22) Filed: Jan. 7, 2022

(65) Prior Publication Data

US 2025/0342385 A1    Nov. 6, 2025

(51) Int. Cl.
    *G06N 20/00*     (2019.01)
(52) U.S. Cl.
    CPC .................................... *G06N 20/00* (2019.01)
(58) Field of Classification Search
    CPC ...................................................... G06N 20/00
    See application file for complete search history.

(56) References Cited

U.S. PATENT DOCUMENTS

| | | |
|---|---|---|
| 5,276,771 A | 1/1994 | Manukian et al. |
| 6,473,746 B1 | 10/2002 | Zakrzewski |
| 7,937,343 B2 | 5/2011 | Zakrzewski |
| 11,138,350 B2 | 10/2021 | Dolan et al. |
| 2019/0147342 A1 | 5/2019 | Goulding et al. |
| 2020/0247433 A1 | 8/2020 | Scharfenberger et al. |
| 2021/0097436 A1 | 4/2021 | Weiland |
| 2022/0026928 A1* | 1/2022 | Stoschek .................. G08G 5/55 |
| 2023/0303095 A1* | 9/2023 | Ye .......................... G06V 20/54 |

FOREIGN PATENT DOCUMENTS

WO     2020131019 A1    6/2020

OTHER PUBLICATIONS

Extended European Search Report, of the European Patent Office, dated May 22, 2023, in corresponding European Patent Application No. 23150275.8.
Office Action issued Dec. 10, 2025 in connection with European Patent Application No. 23150275.8, 6 pages.

\* cited by examiner

*Primary Examiner* — Pei Yong Weng

(57)        ABSTRACT

A real-time artificial intelligence and/or machine learning (AI/ML) system for an aircraft can include an AI/ML module configured to receive one or more inputs and to calculate an AI/ML control output. The AI/ML module can include a non-deterministic model for processing the inputs and outputting the AI/ML control output. The system can include a deterministic module configured to receive one or more inputs and the AI/ML control output from the AI/ML module. The deterministic module can include a deterministic model for processing the inputs and/or AI/ML control output to calculate a deterministic condition. The deterministic module can be configured to check the AI/ML control output against the deterministic condition to determine whether to output the AI/ML control output.

20 Claims, 2 Drawing Sheets

REAL-TIME ARTIFICIAL INTELLIGENCE AND/OR MACHINE LEARNING (AI/ML) SYSTEMS

FIELD

This disclosure relates to real-time artificial intelligence and/or machine learning (AI/ML) systems, e.g., for aircraft.

BACKGROUND

Traditionally, most safety-critical algorithms used in aerospace applications have been forced to be deterministic for certification purposes. Certain algorithms are very complex, and this has led to more complex verification efforts for certification. Indeed, verification can amount to half of the total costs associated with developing functionality for safety critical aerospace applications.

Such conventional methods and systems have generally been considered satisfactory for their intended purpose. However, there is still a need in the art for improvements. The present disclosure provides a solution for this need.

SUMMARY

In accordance with at least one aspect of this disclosure, a real-time artificial intelligence and/or machine learning (AI/ML) system for an aircraft can include an AI/ML module configured to receive one or more inputs and to calculate an AI/ML control output. The AI/ML module can include a non-deterministic model for processing the inputs and outputting the AI/ML control output. The system can include a deterministic module configured to receive one or more inputs and the AI/ML control output from the AI/ML module. The deterministic module can include a deterministic model for processing the inputs and/or AI/ML control output to calculate a deterministic condition. The deterministic module can be configured to check the AI/ML control output against the deterministic condition to determine whether to output the AI/ML control output.

The AI/ML module can be unqualified (e.g., for use on an aircraft) for example. Also, the deterministic module can be qualified.

In certain embodiments, the deterministic module can be a boundary condition checker such that the deterministic model is configured to calculate one or more boundary conditions for the AI/ML control output based on the one or more inputs. The deterministic module can be configured to output the AI/ML control output only if the AI/ML control output satisfies the one or more boundary conditions. In certain embodiments, the deterministic module is configured to output a modified output that is a boundary closest to the AI/ML control output when the AI/ML control output is outside of the one or more boundary conditions. Any suitable modified output and/or boundary conditions are contemplated herein.

The deterministic module can be a reverse computation checker such that the deterministic model is configured to calculate reverse-computed inputs based on the AI/ML control output. The deterministic module can be configured to compare the reverse-computed inputs to the inputs. The deterministic module can be configured to output the AI/ML control output only if the reverse-computed inputs are equal to or within a set range of the inputs. In certain embodiments, the deterministic module can be configured to output a set output or deterministic output when the reverse-computed inputs are not equal to or outside the set range of the inputs.

In certain embodiments, the deterministic module can be a command limiter such that the deterministic model is configured to calculate one or more command limits for the AI/ML control output based on the one or more inputs. The deterministic module can be configured to output the AI/ML control output only if the AI/ML control output is at or within a the one or more command limits. For example, the one or more command limits can be rate limits. In certain embodiments, the deterministic module can be configured to output a modified output that is the command limit closest to the AI/ML control output when the AI/ML control output is not at or within the one or more command limits.

An aircraft can include a real-time artificial intelligence and/or machine learning (AI/ML) system. The AI/ML system can include any suitable AI/ML system disclosed herein, e.g., described above.

A non-transitory computer readable medium having computer executable instructions configured to cause a computer to perform a method. The method can include receiving, at an artificial intelligence and/or machine learning (AI/ML) module of an aircraft, one or more inputs, calculating and outputting an AI/ML control output using AI/ML based on the one or more inputs, receiving, at a deterministic module, the one or more inputs and the AI/ML control output from the AI/ML module, processing the inputs and/or the AI/ML control output to calculate a deterministic condition, and checking the AI/ML control output against the deterministic condition to determine whether to output the AI/ML control output. In certain embodiments, using the AI/ML includes using an unqualified non-deterministic model to processing the inputs and output the AI/ML control output, wherein calculating a deterministic condition includes using a qualified deterministic model.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
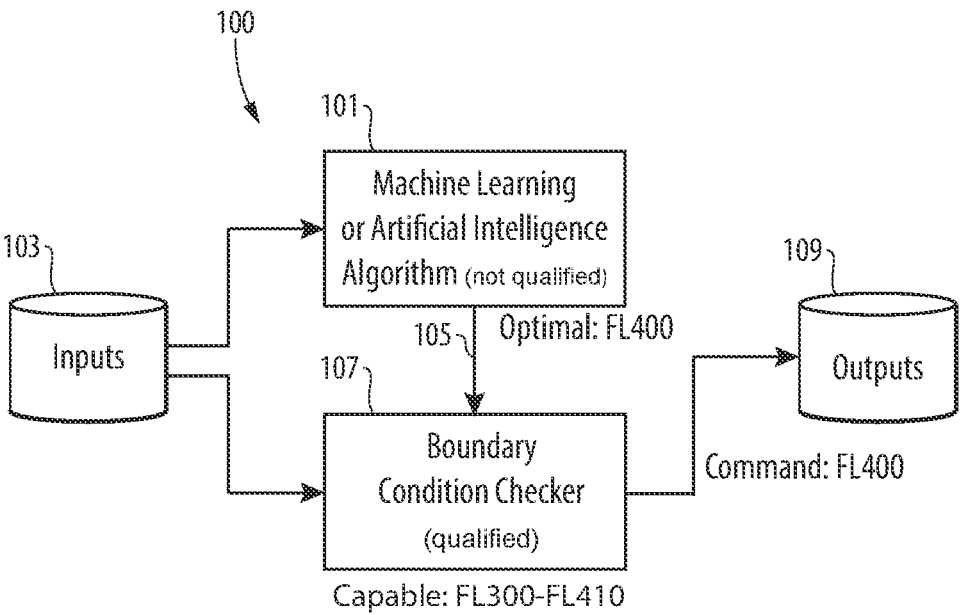
FIG. 1 is a schematic diagram of an embodiment of a system in accordance with this disclosure.
Figure 2:
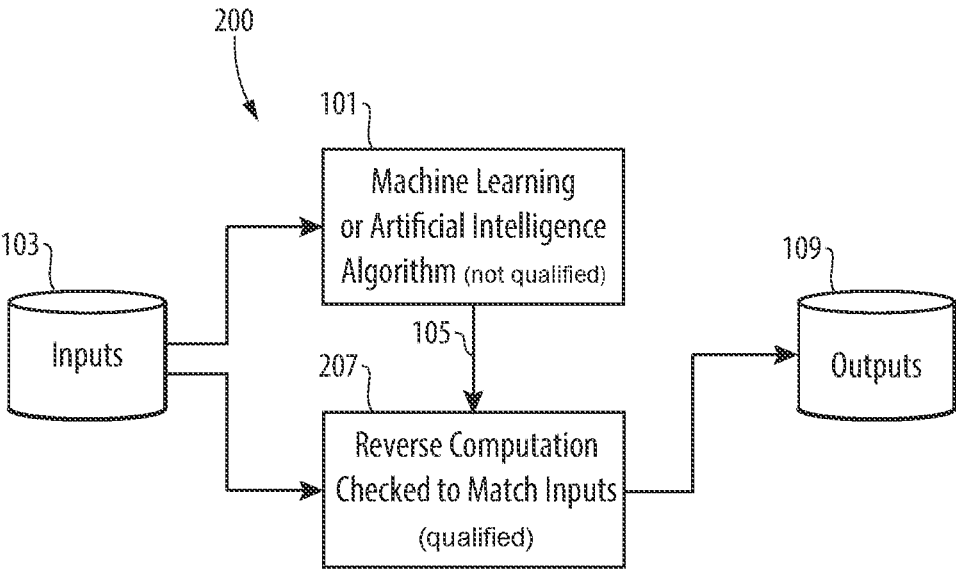
FIG. 2 is a schematic diagram of another embodiment of a system in accordance with this disclosure.
Figure 3:
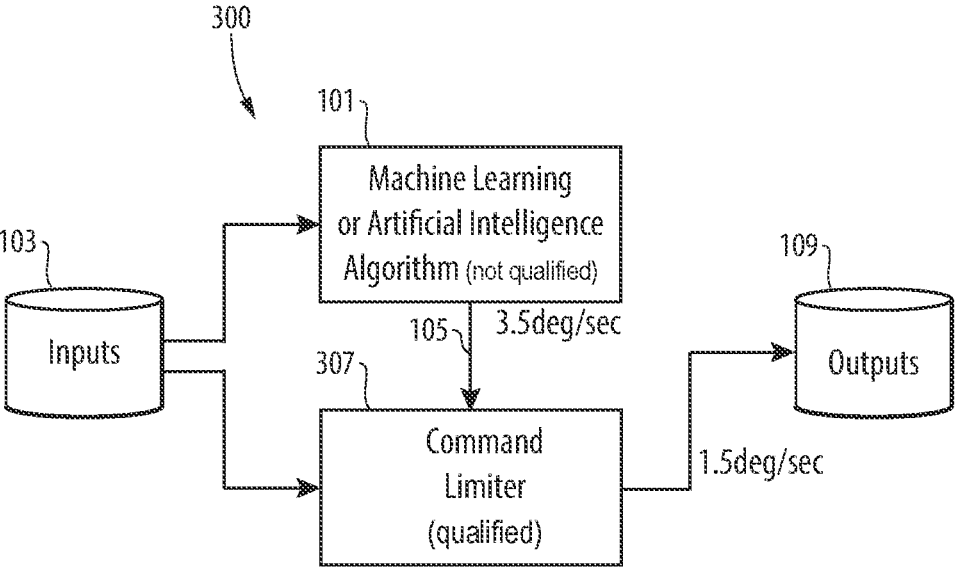
FIG. 3 is a schematic diagram of another embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. Certain embodiments described herein can be used to enable the use of artificial intelligence and/or machine learning in real-time, e.g., on aircraft.

Referring to FIG. 1, a real-time artificial intelligence and/or machine learning (AI/ML) system 100 for an aircraft can include an AI/ML module 101 configured to receive one or more inputs 103 and to calculate an AI/ML control output 105. The AI/ML module 101 can include a non-deterministic model (e.g., as appreciated by those having ordinary skill in the art of AI/ML) for processing the inputs 103 and outputting the AI/ML control output 105. Any suitable model for any suitable function or combinations thereof for the AI/ML module 101 is contemplated herein (e.g., flight level control, engine control, hydraulic system control, aerodynamic surface control, etc.). For example, the AI/ML module can be configured to perform a safety critical function.

The system 100 can include a deterministic module 107 configured to receive one or more inputs 103 and the AI/ML control output 105 from the AI/ML module 101. The deterministic module 107 can include a deterministic model (e.g., as appreciated by those having ordinary skill in the art) for processing the inputs 103 and/or AI/ML control output 105 to calculate a deterministic condition. The deterministic module 107 can be configured to check the AI/ML control output 105 against the deterministic condition to determine whether to output the AI/ML control output 105 (e.g., to create an output 109 as shown). The modules disclosed herein can include any suitable hardware and/or software module(s) configured to perform the disclosed function and/or any other suitable function.

In certain embodiments, the AI/ML module 101 can be unqualified (e.g., within FAA regulations for use on an aircraft) for example. Also, the deterministic module 107 can be qualified (e.g., in accordance with FAA regulations for use on a contract), for example. In this regard, no effort to certify the non-deterministic model of the AI/ML module need to be undertaken, and certification of the easier deterministic model can be done, saving large amounts of time and cost in deploying such systems on an aircraft, for example.

In certain embodiments, as shown in FIG. 1, the deterministic module 107 can be a boundary condition checker such that the deterministic model is configured to calculate one or more boundary conditions for the AI/ML control output 105 based on the one or more inputs 103. The deterministic module 107 can be configured to output the AI/ML control output 105 (e.g., as output 109) only if the AI/ML control output 105 satisfies the one or more boundary conditions (e.g., a numerical value falling within a high and low limit). In certain embodiments, the deterministic module 107 can be configured to output a modified output (e.g., as output 109) that is a boundary closest to the AI/ML control output 105 when the AI/ML control output 105 is outside of the one or more boundary conditions. Any suitable modified output and/or boundary conditions are contemplated herein.

For example, the AI/ML module 101 can be configured to output optimal flight level based on the non-deterministic model. The deterministic module 107 can calculate a range of possible flight levels for the route using the deterministic model to create a range of possible flight levels based on safety factors (e.g., fuel on board, fuel burn, limits of aircraft performance, etc.). If the AI/ML control output 105 optimal flight level falls within the boundaries, the deterministic module 107 can output the AI/ML control output 105 for use by the aircraft control systems (e.g., the autopilot).

In certain embodiments, e.g., as shown in FIG. 2, the deterministic module 207 can be a reverse computation checker such that the deterministic model is configured to calculate reverse-computed inputs based on the AI/ML control output 105. The deterministic module 207 can be configured to compare the reverse-computed inputs to the inputs 103. The deterministic module 207 can be configured to output the AI/ML control output 105 (e.g., as output 109) only if the reverse-computed inputs are equal to or within a set range of the inputs 103. In certain embodiments, the deterministic module 207 can be configured to output a set output (e.g., a known safe operation value) or deterministic output (e.g., an output calculated by the deterministic module 207) when the reverse-computed inputs are not equal to or outside the set range of the inputs 103.

In certain embodiments, as shown in FIG. 3, the deterministic module 307 can be a command limiter such that the deterministic model is configured to calculate one or more command limits for the AI/ML control output 105 based on the one or more inputs 103. The deterministic module 307 can be configured to output the AI/ML control output 105 (e.g., as output 109) only if the AI/ML control output 105 is at or within a the one or more command limits. For example, the one or more command limits can be rate limits (e.g., an angular rate such as degrees per second for a mechanical system). In certain embodiments, the deterministic module 307 can be configured to output a modified output (e.g., as output 109) that is the command limit closest to the AI/ML control output 105 (e.g., a high numerical limit) when the AI/ML control output 105 is not at or within the one or more command limits.

For example, as shown, the AI/ML module 101 can be configured to output a rate as the AI/ML control output 105 (e.g., 3.5 deg/sec as shown). The deterministic module 307 can calculate a rate limit (e.g., a physical limit, a safety limit, a variable limit based on inputs, etc.) and to compare the AI/ML control output 105 to the AI/ML control output 105. The deterministic module 307 can be configured to output the AI/ML control output 105 (e.g., as output 109) if it is below the rate limit (e.g., 1.5 deg/sec as shown), or to output the rate limit (e.g., 1.5 deg/sec as shown) if the AI/ML control output 105 exceeds the rate limit (e.g., as shown in FIG. 3).

In accordance with at least one aspect of this disclosure, an aircraft (not shown) can include a real-time artificial intelligence and/or machine learning (AI/ML) system. The AI/ML system can include any suitable AI/ML system (e.g., systems 100, 200, 300) disclosed herein, e.g., described above. Any suitable combinations of functions, AI/ML modules and models, deterministic modules and models, etc., are contemplated herein.

A non-transitory computer readable medium having computer executable instructions configured to cause a computer to perform a method. The method can include receiving, at an artificial intelligence and/or machine learning (AI/ML) module of an aircraft, one or more inputs, calculating and outputting an AI/ML control output using AI/ML based on the one or more inputs, receiving, at a deterministic module, the one or more inputs and the AI/ML control output from the AI/ML module, processing the inputs and/or the AI/ML control output to calculate a deterministic condition, and checking the AI/ML control output against the deterministic condition to determine whether to output the AI/ML control output. In certain embodiments, using the AI/ML includes using an unqualified non-deterministic model to processing the inputs and output the AI/ML control output, wherein calculating a deterministic condition includes using a qualified deterministic model.

Certain embodiments can check the output of an AI/ML module against known limits or boundary conditions. In certain embodiments, a reverse computation can be performed on the AI/ML control output to check whether the results (e.g., reverse computed inputs) makes sense against the actual inputs (e.g., or some portion of the inputs, e.g., within some error). A reverse model can be much simpler than AI/ML models, and is deterministic (e.g., easy to certify). Certain embodiments can check physical limits (like rates of fuel flow change, rates of motion change, etc.), and check a rate command control, e.g., to be within a range.

Embodiments can be configured for real-time use on aircraft. In certain embodiments, can host the AI/ML module 101 in a protected partition/separate hardware, for example. The AI/ML algorithm can be isolated in time/space partitions such that any failure in the AI/ML algorithm does not impact the operation of the other partitions. For example, this can include errors like divide by zero exceptions and the reset of the AI/ML partition independent of all other processing. Embodiments can include isolation of the AI/ML processing to its own processing environment. Any other suitable disambiguation is contemplated herein. Traditional non-deterministic AI/ML systems cannot be used real time in aircraft devices since certification is potentially impossible.

Embodiments can be applied to fuel management, center of gravity management, hydraulic/pneumatic monitoring, landing gear stress, actual braking action, takeoff acceleration and RVSM compliance and alerting, for example. Any suitable use, e.g., on an aircraft as part of any suitable aircraft system or device, is contemplated herein.

Embodiments can use an architectural solution to address the complexity associated with machine learning or artificial intelligence. Rather than attempt to fully verify a complex artificial intelligence and/or machine learning algorithm itself for aircraft use, embodiments can instead check the output of the computation against known limits or boundary conditions or use any other suitable methods (e.g., using one or more qualified deterministic models).

For example, certain embodiments can reverse calculate the AI/ML result to confirm correctness. In this case, if the AI/ML output (e.g., optimal altitude, optimal angle of attack) falls within bounds of simpler qualified checker (e.g., limits based on fuel, other limits), then the AI/ML module can be allowed to control.

Certain embodiments can limit the commands associated with the AI/ML algorithm, e.g., to check the output to assure that it does not exceed the physical capabilities of the system (e.g., Absolute Limits). These limits can be static or dynamic. An example of a dynamic limit can include an actuation command for 3.5 deg/sec movement of a surface that was limited to only 1.5 deg/sec. The limiter may still allow the movement command to be issued, but limit it to a safe value.

Embodiments can include a tool to compare loadable data stack against source logic and I/O definition, and provide a means to certify the tool chain without having to certify the forward path algorithms (AI/ML). For example, if an AI based function can compute thrust commands to remaining engine(s) based upon a wide variety of inputs, and a monitor function can use the outputs (e.g., thrust command for each engine) plus meta-data inputs (e.g., airspeed, groundspeed, spoiler positions, anti-skid availability, winds, runway condition, etc.) and calculated the boundary conditions (e.g., a maximum/minimum allowable thrust under those conditions), the monitor can then compare the output of the AI, and, as long as it was "in bounds", allow it to be used. If the AI results is out of bounds, then an appropriate fail-safe or fail-operational output could be chosen. Fail-safe may be to not allow any reverse thrust and fail-operational may be to allow a certain amount (e.g., half of the total available) that is known to be "safe". The monitor function can use fewer inputs, simpler calculations and come up with only a range of results instead of an optimal result, but such a module is reasonably certifiable.

Embodiments can separate the true AI/ML algorithms and computations from the "qualified" path. Instead, embodiments can utilize a simpler "qualified monitor" that acts as a checker/limiter to the AI/ML computation. In certain embodiments, the "monitor" channels can function to determine whether the system is in "normal" or "alternate" or in severe degraded conditions, e.g., operating in a "direct law" mode. Embodiments can be configured to be fail-operative (operating on an alternate law) and/or fail-safe (operating on a direct law) if AI/ML functionality were to compute results out of bounds.

This approach enables the use of artificial intelligence and machine learning in safety critical aerospace applications. It does so in a way that has historical precedence. It is very similar to the control/monitor channels associated with Fly-By-Wire systems where the monitor channel is generally a simpler, easy to fully verify, algorithm that checks the result of the primary control channel. If the result is not acceptable, the monitor blocks the control channel output and selects a more conservative (alternate or direct law) solution instead.

Embodiments can include a method for certifying artificial intelligence/machine learning in aerospace. Embodiments can utilize certifiable modules to check unqualified modules.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A real-time artificial intelligence and/or machine learning (AI/ML) system for an aircraft, comprising:

an AI/ML module configured to receive one or more inputs and to calculate an AI/ML control output, wherein the AI/ML module includes a non-deterministic model for processing the one or more inputs and outputting the AI/ML control output; and a deterministic module configured to receive the one or more inputs and the AI/ML control output from the AI/ML module, wherein the deterministic module includes a deterministic model for processing the one or more inputs and/or the AI/ML control output to calculate a deterministic condition, wherein the deterministic module is configured to check the AI/ML control output against the deterministic condition to determine whether the AI/ML control output satisfies the deterministic condition;

wherein the deterministic module comprises a reverse computation checker such that the deterministic module is configured to calculate reverse-computed inputs based on the AI/ML control output, wherein the deterministic module is configured to compare the reverse-computed inputs to the one or more inputs, and wherein the deterministic module is configured to output the AI/ML control output only if the reverse-computed inputs are equal to or within a set range of the one or more inputs.

2. The system of claim 1, wherein the AI/ML module is unqualified according to one or more regulations with respect to aircraft, and wherein the deterministic module is qualified according to the one or more regulations.

3. The system of claim 1, wherein the deterministic module further comprises a boundary condition checker such that the deterministic module is configured to calculate one or more boundary conditions for the AI/ML control output based on the one or more inputs, and wherein the deterministic module is configured to output the AI/ML control output only if the AI/ML control output satisfies the one or more boundary conditions.

4. The system of claim 3, wherein the deterministic module is configured to output a modified output that is a boundary closest to the AI/ML control output when the AI/ML control output is outside of the one or more boundary conditions.

5. The system of claim 4, wherein the deterministic module is configured to output the modified output that is a set output or deterministic output when the reverse-computed inputs are not equal to or outside the set range of the one or more inputs.

6. The system of claim 1, wherein the deterministic module further comprises a command limiter such that the deterministic module is configured to calculate one or more command limits for the AI/ML control output based on the one or more inputs, and wherein the deterministic module is configured to output the AI/ML control output only if the AI/ML control output is at or within the one or more command limits.

7. The system of claim 6, wherein the one or more command limits are rate limits.

8. The system of claim 6, wherein the deterministic module is configured to output a modified output that is a command limit closest to the AI/ML control output when the AI/ML control output is not at or within the one or more command limits.

9. An aircraft, comprising:

a real-time artificial intelligence and/or machine learning (AI/ML) system, comprising:

an AI/ML module configured to receive one or more inputs and to calculate an AI/ML control output, wherein the AI/ML module includes a non-deterministic model for processing the one or more inputs and outputting the AI/ML control output; and a deterministic module configured to receive the one or more inputs and the AI/ML control output from the AI/ML module, wherein the deterministic module includes a deterministic model for processing the one or more inputs and/or the AI/ML control output to calculate a deterministic condition, wherein the deterministic module is configured to check the AI/ML control output against the deterministic condition to determine whether the AI/ML control output satisfies the deterministic condition;

wherein the deterministic module comprises a reverse computation checker such that the deterministic module is configured to calculate reverse-computed inputs based on the AI/ML control output, wherein the deterministic module is configured to compare the reverse-computed inputs to the one or more inputs, and wherein the deterministic module is configured to output the AI/ML control output only if the reverse-computed inputs are equal to or within a set range of the one or more inputs.

10. The aircraft of claim 9, wherein the AI/ML module is unqualified according to one or more regulations with respect to aircraft, and wherein the deterministic module is qualified according to the one or more regulations.

11. The aircraft of claim 9, wherein the deterministic module further comprises a boundary condition checker such that the deterministic module is configured to calculate one or more boundary conditions for the AI/ML control output based on the one or more inputs, and wherein the deterministic module is configured to output the AI/ML control output only if the AI/ML control output satisfies the one or more boundary conditions.

12. The aircraft of claim 11, wherein the deterministic module is configured to output a modified output that is a boundary closest to the AI/ML control output when the AI/ML control output is outside of the one or more boundary conditions.

13. The aircraft of claim 12, wherein the deterministic module is configured to output the modified output that is a set output or deterministic output when the reverse-computed inputs are not equal to or outside the set range of the one or more inputs.

14. The aircraft of claim 9, wherein the deterministic module further comprises a command limiter such that the deterministic module is configured to calculate one or more command limits for the AI/ML control output based on the one or more inputs, and wherein the deterministic module is configured to output the AI/ML control output only if the AI/ML control output is at or within the one or more command limits.

15. The aircraft of claim 14, wherein the one or more command limits are rate limits.

16. The aircraft of claim 14, wherein the deterministic module is configured to output a modified output that is a command limit closest to the AI/ML control output when the AI/ML control output is not at or within the one or more command limits.

17. A non-transitory computer readable medium having computer executable instructions configured to cause a computer to perform a method, the method comprising:

receiving, at an artificial intelligence and/or machine learning (AI/ML) module of an aircraft, one or more inputs;

calculating and outputting an AI/ML control output using AI/ML based on the one or more inputs;

receiving, at a deterministic module, the one or more inputs and the AI/ML control output from the AI/ML module;

processing the one or more inputs and/or the AI/ML control output to calculate a deterministic condition;

checking the AI/ML control output against the deterministic condition to determine whether the AI/ML control output satisfies the deterministic condition;

calculating reverse-computed inputs based on the AI/ML control output using a reverse computation checker implemented by the deterministic module;

comparing the reverse-computed inputs to the one or more inputs using the deterministic module; and outputting the AI/ML control output only if the reverse-computed inputs are equal to or within a set range of the one or more inputs using the deterministic module.

18. The non-transitory computer readable medium of claim 17, wherein:

using the AI/ML includes using a non-deterministic model to process the one or more inputs and output the AI/ML control output, the non-deterministic model unqualified according to one or more regulations with respect to aircraft; and calculating the deterministic condition includes using a deterministic model, the deterministic model qualified according to the one or more regulations.

19. The system of claim 1, wherein the deterministic module is further configured to output the AI/ML control output in response to determining that the AI/ML control output satisfies the deterministic condition and to output a modified output in response to determining that the AI/ML control output does not satisfy the deterministic condition.

20. The aircraft of claim 9, wherein the deterministic module is further configured to output the AI/ML control output in response to determining that the AI/ML control output satisfies the deterministic condition and to output a modified output in response to determining that the AI/ML control output does not satisfy the deterministic condition.

* * * * *